United States Patent [19]

Jarvis et al.

[11] 4,367,242
[45] Jan. 4, 1983

[54] ROAST POULTRY COATING MIX AND PROCESS

[75] Inventors: Gary W. Jarvis, Hartly, Del.; Stevan A. Angalet, Jackson, N.J.; William J. Horan, Dover, Del.

[73] Assignee: General Foods Corporation, White Plains, N.Y.

[21] Appl. No.: 232,076

[22] Filed: Feb. 6, 1981

[51] Int. Cl.³ .............................................. A23L 1/315
[52] U.S. Cl. ................................... 426/293; 426/296; 426/555; 426/652
[58] Field of Search ............... 426/289, 293, 296, 555, 426/652

[56] References Cited

U.S. PATENT DOCUMENTS 2,721,142 10/1955 Shinn et al. .......................... 426/302
3,586,512 6/1971 Mancuso et al. ..................... 426/250
3,676,158 7/1972 Fischer et al. ....................... 426/293
3,723,137 3/1973 Fischer et al. ....................... 426/293
3,843,827 10/1974 Lee et al. ............................. 426/293
3,852,501 12/1974 Fazzina et al. ...................... 426/293
4,208,442 6/1980 Evans et al. ......................... 426/293

Primary Examiner—Raymond N. Jones
Assistant Examiner—Elizabeth A. Hatcher
Attorney, Agent, or Firm—Thomas R. Savoie; Daniel J. Donovan

[57] ABSTRACT

A roasted chicken coating mix is provided which imparts to a coated and baked poultry, the taste, texture and appearance of a roasted and basted poultry. This mix is of a controlled particle size and contains critical amounts of specific types of gelatin, shortening, dextrin and starch.

7 Claims, No Drawings

ROAST POULTRY COATING MIX AND PROCESS

BACKGROUND OF THE INVENTION

The present invention relates generally to edible food coatings and more particularly is directed to a coating mix to be applied to poultry prior to baking in order to provide a roasted and basted poultry taste, texture and appearance.

Foods such as meat, fish, poultry and vegetables are conventionally coated (breading or batter) prior to cooking by pan frying, deep fat frying or baking. The intent of many of these coating and cooking procedures is to obtain a coating with the taste, texture and appearance associated with fried foods. One such procedure involves the initial coating of the food with a liquid batter followed by the application of a particulate farinacious material or breading to the batter coated surface. The coated food is then either fried or baked (see U.S. Pat. Nos. 3,723,137, 3,676,158, and 3,843,827). Alternatively, the food can be initially coated with a specially formulated dry mix followed by baking to impart a fat fried appearance, texture and taste to the baked food (see U.S. Pat. Nos. 3,852,501 and 3,586,512). While these procedures have been successful in imparting a fat fried appearance, texture and taste, there is still a need for a coating mix which when applied to poultry and than baked imparts the texture, taste and appearance of roasted and basted poultry.

When poultry is roasted and basted in a covered pan, the resulting poultry posseses a uniform and golden brown, crisp skin in which the meat is juicy and there is a flavor unique to roasted poultry. When poultry, especially poultry parts (e.g., chicken), is baked without a covered roasting pan and without basting the result is that the poultry is more dried out with a non-uniform, chewy and less crisp skin, and the flavor is bland with a substantial loss of the desireable roasted flavor and effect.

Thus, it is an object of this invention to provide a dry coating mix which when coated onto poultry and then baked imparts the resultant baked poultry with the taste, texture and appearance of roasted and basted poultry.

SUMMARY OF THE INVENTION

Briefly, the present invention provides a dry mix which imparts the taste, texture and appearance of roasted and basted poultry to poultry which is coated and baked. This dry mix consists essentially of 10 to 40% of gelatin having a bloom of 100 to 300, 10 to 40% of powdered shortening having a melting point range of 105° F. to 160° F. (40° C. to 70° C.), 10 to 30% of a dextrin having a DE of 5 to 15, and 5 to 25% of a starch, all percents being by weight of the dry coating mix. This coating mix has a particle size wherein less than 10% by weight of the mix is retained on a 20 mesh U.S. standard screen, less than 20% by weight of the mix is retained on a 35 mesh U.S. standard screen and less than 75% by weight of the mix passes through a 100 mesh U.S. standard screen. The coating mix is applied to the surface of moistened poultry, followed by baking.

DETAILED DESCRIPTION OF THE INVENTION

The dry coating mix of the present invention when coated onto poultry and then baked, imparts to the resultant poultry the taste, texture and appearance of roasted and basted poultry. The baked coating is smooth, continuous, takes on a uniform and golden brown hue and has a hard, thin and crisp surface. As well, the coating seals in the juices of the poultry meat and imparts a flavor which is characteristic of roasted and basted poultry. In comparison, a dry mix which imparts a fat fried appearance, taste and texture results in a coating which is relatively thick, flaky and particulate.

To achieve the desired effects, the dry coating mix contains critical amounts of specific types of gelatin, shortening, dextrin and starch. Other ingredients (e.g. bread crumbs) which would detract from the desired characteristics of roasted and basted poultry are excluded from the dry coating mix. Also critical to the dry coating mix is controlling the particle size to exclude substantial amounts of larger particles, which would impart a gritty, non-uniform, and particulate coating and would detract from the hard, thin, and crisp coating surface, as well as and excluding excessive amounts of very fine particles, which would result in a non-uniform coating and a floury taste and texture.

The gelatin is a key ingredient of the dry coating mix in that it is essential in forming the crisp thin film upon baking, as well as enabling the coating to adhere to the poultry surface. The gelatin has a bloom strength within the range of 100 to 300 to provide the desired texture, preferably within a range of 210 to 265, for an optimum crisp, uniform and adherent coating. At bloom strengths below 100 the coating does not adhere adequately, while at bloom strengths above 300 the gelatin has difficulty dissolving, forming lumps. The level of gelatin is within the range of 10 to 40% by weight of the dry coating mix, preferably 20 to 30% by weight. Other proteins could not be substituted for the gelatin.

The shortening may be any solid vegetable or animal shortening in powdered form and preferably can be hydrogenated vegetable oils such as corn oil, cotton seed oil, palm kernal oil, soybean oil and the like. Critically, the shortening has a high melting point, within the range 105° F. to 160° F. (40° C. to 70° C.), preferably 125° F. to 150° F. (50° C. to 65° C.), to provide the slow melt which bastes, provides a uniform coating and prevents burning of the coated poultry upon baking. The shortening is present in an amount within a range of 10 to 40% by weight of the dry mix, preferably 20 to 30%, to impart the desired taste, texture and appearance.

The dry coating mix also contains a dextrin which acts as a film former and bulking agent, aids the coating in adhering to the poultry and promotes the formation of a crisp texture upon baking the coated poultry. The browning of the dextrin during baking also helps form the desired brown color for the coating. The dextrin should have a DE (dextrose equivalent) within a range of 5 to 15 and preferably 9 to 12 to impart the desireable hard, thin and crisp coating surface. At a DE of about 20 or above the coating becomes sticky, non-uniform and chewy, while at a DE below 5, an off flavor is evident. Dextrin is present at a level of 10 to 30% by weight of the dry coating mix, preferably 15 to 25%. Within the specified amount and DE the dextrin is able to effectively form the desired matrix for the coating upon baking.

A starch is incorporated into the dry coating mix as a filler, as well as to help the coating to adhere to the poultry during the initial cooking period. This starch can be in any common form such as pregelatinized, raw, chemically modified, or physically modified, as well as from common sources such as tapioca, potato, corn, etc. A flour may also be employed for its starch content, as well as bread crumbs which have been ground to pass through a 100 mesh U.S. standard screen. Preferably, the starch is a pregelatinized starch as it captures moisture rapidly, adheres quickly and is a superior film former, as well as providing less of a floury taste. The starch is present in the dry coating mix at a level of 5 to 25% by weight of the coating mix, preferably 10 to 20%. Common bread crumbs which are retained on a 100 mesh U.S. standard screen are exluded from the dry coating mix as they impart a gritty and particulate texture which is not characteristics of roasted and basted poultry.

The dry coating mix also desirably contains flavorings and salt to impart the desired flavor and taste to the resultant baked and coated poultry. The flavoring can include a wide variety of seasonings and spices such as onion, pepper, garlic, paprika, etc. and are incorporated at levels effective for the desired roasted and basted poultry flavor. Salt, which is also incorporated for flavor, is desirably incorporated at a level of 5 to 15% by weight of the coating mix. Color may also be incorporated in the dry coating mix, but it is not necessary to achieve the desired appearance for the baked coated poultry.

Critical to obtaining the desired roasted and basted poultry texture and appearance is excluding a substantial amount of larger size particles and excessive amounts of finer particles. This controlled particle size provides the hard, thin and crisp surface essential to obtaining the roasted and basted poultry appearance and texture, but avoiding a gritty, particulate texture or a floury taste. The dry coating mix should have a particle size wherein less than 10% by weight of the dry mix is retained on a 20 mesh U.S. standard screen, less than 20% by weight of the dry mix is retained on a 35 mesh U.S. standard screen and less than 75% by weight of the dry mix passes a 100 mesh U.S. standard screen. The following table indicates the optimum and preferred particle size distribution of the dry coating mix, expressed as percent by weight of the dry coating mix:

| U.S. Standard Screens | Optimum Particle Size | Preferred Particle Size |
|---|---|---|
| on 20 | 2% | 0-5% |
| through 20 on 60 | 50% | 40-60% |
| through 60 on 100 | 40% | 30-50% |
| through 100 | 8% | 0-15% |

To prepare the baked and coated poultry with the taste, texture and appearance of a roasted and basted poultry, the poultry is first moistened and then coated with the dry coating mix, followed by baking. The baking is commonly conducted at a temperature of 350° F. to 450° F. (175° C. to 230° C.) for a period of time effective to thoroughly cook the poultry, typically about 1 hour. The poultry can be chicken, turkey, duck or the like and is preferably in the form of poultry pieces or parts. Through use of the dry coating mix of this invention, the long cook times (e.g. 2 to 3 hours) and basting procedures commonly employed in preparing basted and roasted poultry or chicken is eliminated. Instead, a quick cooking, baked poultry is prepared with the taste, texture and appearance of a roasted and basted poultry. This is achieved by the critical combination of the specified ingredients in a dry mix with a controlled particle size combining to uniformly coat and baste the poultry during baking, sealing in the natural meat juices, eliminating pockets of dry mix on the poultry, and preventing burning. As well, the controlled film formation results in a hard, thin, crisp and adherent coating surface, as is characteristic of a roasted and basted poultry.

This invention is further illustrated by the following examples.

EXAMPLE I

The following ingredients are blended to form the roast poultry coating mix:

| Ingredients | % by weight |
|---|---|
| Gelatin (240 Bloom) | 24.6 |
| Powdered Shortening (125° F., 52° C., melting point) | 24.6 |
| Dextrin (10 DE) | 17.0 |
| Pregelatinized Modified Waxy Maize Starch | 13.0 |
| Salt | 11.8 |
| Spices and Flavors | 9.0 |

The dry coating mix had the optimum particle size distribution (as detailed above) and at a level of 64 gms was coated onto 2½ lbs (1.13 Kg) of moistened chicken parts, followed by baking at 400° F. (204° C.) for 50 minutes.

The baked coated chicken had a taste, texture and appearance characteristic of roasted and basted chicken. The coating was smooth, continuous and uniform and had a thin, crisp and hard coating surface with a roast chicken flavor. The chicken meat itself was very juicy.

EXAMPLE II

The following is a comparison between a chicken prepared by a roasting and basting procedure, a chicken prepared by baking and a chicken coated with the dry coating mix of this invention followed by baking.

In Sample 1, a roasted and basted chicken was prepared by placing a whole chicken coated with spices into a covered roasting pan and then in an oven heated to 325° F. (163° C.). The chicken was roasted in the covered pan for 2 hours, then uncovered and roasted for an additional 30 minutes, basting every 10 minutes.

In Sample 2, a baked chicken was prepared by cutting a whole chicken into parts (using one half of the chicken for Sample 2 and the other half for Sample 3), then after coating with spices, placing the chicken parts in a baking pan and then into an oven heated to 400° F. (204° C.), for 60 minutes.

In Sample 3, the chicken parts of the other half of the chicken (from Sample 2) are coated with the dry coating mix of Example 1. The coated chicken parts are placed in a baking pan, then into an oven heated to 400° F. (204° C.), for 60 minutes.

The following table compares the three cooked samples, as evaluated by an expert panel for taste, surface texture, appearance and meat texture.

|  | Sample I | Sample II | Sample III |
|---|---|---|---|
| Taste | roast chicken flavor | more bland flavor less roasted flavor | roast chicken flavor |
| Surface Texture | thin & crisp skin skin uniform, smooth & continuous | skin chewy & less crisp and non-uniform | thin, crisp & hard coating coating uniform, smooth and continuous |
| Appearance | golden & uniform brown hue | blotchy, yellow or pale non-uniform browning | golden & uniform brown hue |
| Meat Texture | very juicy tender | dried out tougher | juicy, slightly less than Sample 1 tender |

The above samples demonstrate the usefulness of the dry coating mix in imparting to a baked coated chicken, the taste, appearance and texture of a roasted and basted chicken without a roasting and basting procedure, as well as maintaining the juiciness of the meat, as is characteristic of a roasted and basted chicken.

What is claimed is:

1. A process for producing a baked poultry product having the taste, texture, appearance and juiciness of roasted and basted poultry, including a thin, crisp, non-gritty, golden-brown coating which seals in the juices of the poultry meat, comprising the steps of:
   moistening the surface of the poultry;
   coating the moistened poultry with a dry coating mix consisting essentially of 20 to 30% of gelatin having a bloom of 100 to 300, 10 to 40% of powdered shortening having a melting point in the range of 105° F. to 160° F., 10 to 30% of a dextrin having a DE of 5 to 15, 10 to 20% of a pregelatinized starch, and flavorings, said dry coating mix having a particle size wherein from 0 to 5% is retained on a 20 mesh U.S. standard screen, 40 to 60% passes a 20 mesh U.S. standard screen and is retained on a 60 mesh U.S. standard screen, 30 to 50% passes a 60 mesh U.S. standard screen and is retained on a 100 mesh U.S. standard screen, and 0 to 15% passes a 100 mesh U.S. standard screen, all percents being by weight of the dry coating mix; and
   baking the poultry.

2. Process of claim 1 wherein the dry mix contains 20 to 30% of shortening, and 15 to 25% of dextrin.

3. Process of claim 2 wherein the gelatin has a bloom of 210 to 265, the dextrin has a DE of 9 to 12, and the shortening has a melting point of 125° to 150° F.

4. Process of claim 2 wherein the poultry is chicken parts.

5. A dry coating mix for producing a baked poultry product having the taste, texture, appearance and juiciness of roasted and basted poultry including a thin, crisp, non-gritty, golden-brown coating which seals in the juices of the poultry meat, consisting essentially of:
   from 20 to 30% gelatin having a bloom of 100 to 300;
   10 to 40% powdered shortening having a melting point in the range of 105° F. to 160° F.;
   10 to 30% dextrin with a DE of 5 to 15;
   10 to 25% pregelatinized starch; and
   a flavoring, the dry coating mix having a particle size wherein from 0 to 5% is retained on a 20 mesh U.S. standard screen, 40 to 60% passes a 20 mesh U.S. standard screen and is retained on a 60 mesh U.S. standard screen, 30 to 50% passes a 60 mesh U.S. standard screen and is retained on a 100 mesh U.S. standard screen, and 0 to 15% passes a 100 mesh U.S. standard screen, all percents being by weight of the dry coating mix.

6. Dry mix of claim 5 wherein the shortening is at a level of 20 to 30%, and the dextrin is at a level of 15 to 25%.

7. Dry mix of claim 5 wherein the gelatin has a bloom of 210 to 265, the dextrin has a DE of 9 to 12, and the shortening has a melting point of 125° to 150° F.

* * * * *